R. TRUMPOLD & A. KOERNER.
FOLDING POULTRY COOP.
APPLICATION FILED DEC. 12, 1907.
957,274.
Patented May 10, 1910.
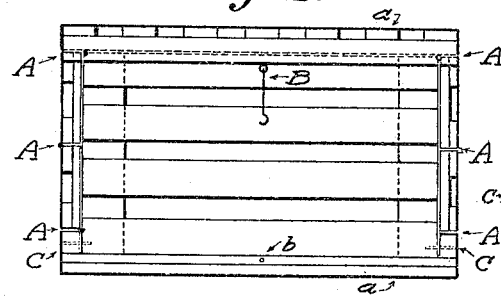
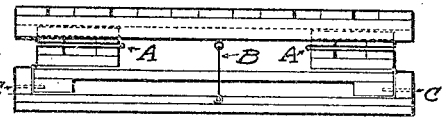
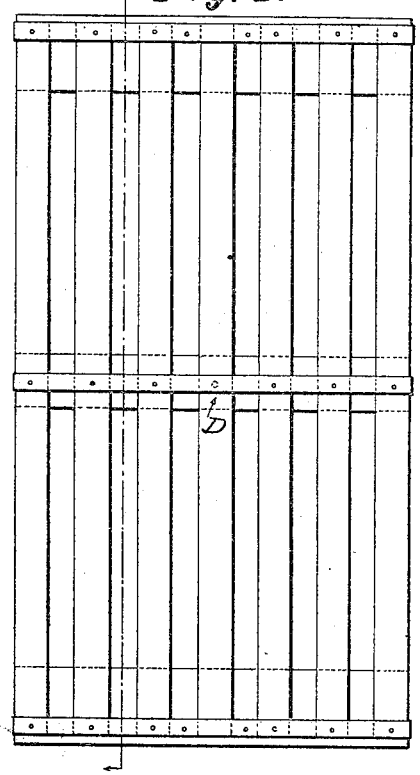
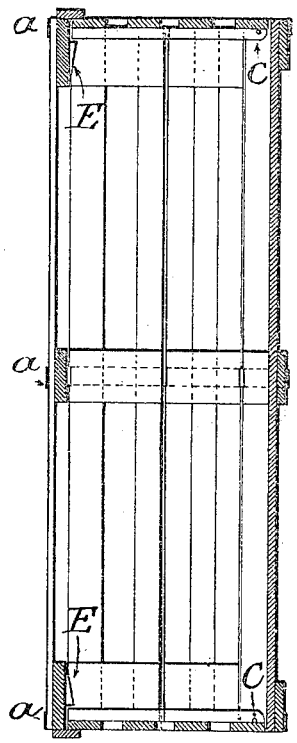
Witnesses.
Inventors.
Robert Trumpold
Albin Koerner

UNITED STATES PATENT OFFICE.

ROBERT TRUMPOLD AND ALBIN KOERNER, OF ST. LOUIS, MISSOURI.

FOLDING POULTRY-COOP.

957,274.

Specification of Letters Patent. Patented May 10, 1910.

Application filed December 12, 1907. Serial No. 406,174.

*To all whom it may concern:*

Be it known that we, ROBERT TRUMPOLD and ALBIN KOERNER, citizens of the United States, and residents of St. Louis, State of Missouri, have invented a new and useful Folding Poultry-Coop, of which the following is a specification.

Our invention relates to folding poultry crates.

The object of our invention is the provision of a folding poultry crate of simple, durable, strong and inexpensive construction, having but few parts, no loose attachments which will be liable to become detached, and which can be rapidly and easily extended into condition for use in transporting poultry or as a coop therefor, or readily folded so as to occupy but small space and be adapted to be kept in compact condition for re-shipment.

The invention is set forth fully hereinafter and the novel features are recited in the appended claim.

In the accompanying drawings:—Figure 1 is a plan view of the crate when in extended condition; Fig. 2, an end elevation thereof; Fig. 3, a longitudinal section thereof; and Fig. 4, an end view of the crate when in folded and secured condition.

The bottom, top, sides and ends are all of slatted construction, being provided with suitable cross cleats and bound by metal straps *a*. The ends are hinged in between side rails of the bottom by the pins C, permitting said ends to fold inwardly so as to lie flat upon the bottom, as shown in Fig. 4. The sides are composed of jointed or hinged sections which run longitudinally of the crate, being hinged together and also hinged to the side rails of the bottom and to the under surface of the top or cover by the hinges A. This construction permits the ends to be first folded inwardly flat upon the bottom and the sides to then be collapsed inwardly to rest upon the ends, and the whole crate in its collapsed condition, as shown in Fig. 4, secured together by hooks B on the top which engage with pins *b* on the bottom at both ends of the crate. The crate is thus held in compact and transportable condition without danger of detachment or looseness of the parts so that it may be readily re-shipped after use.

To obviate the necessity of providing a hinged door which adds to the expense of the crate, we make one of the slats of the top removable endwise of the crate, the ends of said slat being guided between blocks on the top, and said slat being held by a detachable pin D. By removing the pin D, the slat can be slid outwardly any desired extent to permit exit of the fowls or placing them within the crate, and hence the latter can be used as a coop.

The ends of the top overhang to form abutment strips for the free extremities of the ends and spring catches E provide means for locking the ends in position when they are raised, said catches being adapted for easy release from the said ends.

Having thus described our invention, what we claim as new and desire to secure by Letters Patent, is:—

A folding poultry crate comprising a bottom, ends hinged to said bottom and adapted to fold inwardly thereon, a top, sides, each composed of a plurality of longitudinally extending sections hinged together and respectively hinged to both the top and the bottom, abutment strips on the ends of the top to prevent outward swinging of the ends when they are raised, and spring catches carried by the top which are positioned so that they are adapted to be engaged by the ends and to lock said ends when the latter are brought into raised position.

ROBERT TRUMPOLD.
ALBIN KOERNER.

Witnesses:
J. H. TOENISKOETTER,
J. W. HEAD.